United States Patent [19]
Szegedi et al.

[11] Patent Number: 5,386,313
[45] Date of Patent: Jan. 31, 1995

[54] REFLECTIVE MAGNETO-OPTIC SPATIAL LIGHT MODULATOR ASSEMBLY

[76] Inventors: Nicholas J. Szegedi, 229 Goldenwood Cir., Wood Ranch, Calif. 93065; Lawrence I. Garett, 10910 Dempsey Ave., Granada Hills, Calif. 91344; Theodore R. Maki, 18631 Citronia, Northridge, Calif. 91324; Dennis N. Smith, 1461 Alexander St., Simi Valley, Calif. 93065

[21] Appl. No.: 29,719

[22] Filed: Mar. 11, 1993

[51] Int. Cl.$^6$ .................... G02B 26/08; H01L 25/00
[52] U.S. Cl. .................... 359/280; 359/281; 359/298; 359/223
[58] Field of Search .................... 359/280, 223, 118; 346/108

[56] References Cited

U.S. PATENT DOCUMENTS 4,712,888  12/1987  Brooks .................... 359/223

*Primary Examiner*—Viet Q. Nguyen
*Attorney, Agent, or Firm*—D. J. Ellingsberg

[57] ABSTRACT

A reflective magneto-optic spatial light modulator (MOSLM TM) assembly has a nonmagnetic protective housing that receives, positions, and protects a spatial light modulator (SLM) chip that is formed from relatively fragile magneto-optic material from deformations caused by mechanical stress and by excessive temperature changes. The assembly further has a channelled ingress and egress of incident electromagnetic radiation, such as visible and coherent light, to and from the SLM chip.

11 Claims, 3 Drawing Sheets

REFLECTIVE MAGNETO-OPTIC SPATIAL LIGHT MODULATOR ASSEMBLY

COPYRIGHT MATERIAL

The disclosure of this patent contains material which is the subject of copyright protection. Reproduction of the patent document as it appears in the Patent and Trademark Office is permitted in furtherance of the United States Patent Laws (Title 35 United States Code). The copyright owner reserves all other rights under the United States Copyright Laws (Title 17 United States Code).

BACKGROUND OF THE INVENTION

1. Field of the Invention

The invention is a reflective, magneto-optic spatial light modulator (MOSLM TM) assembly that protects an electrically addressable chip, which is formed from a structurally fragile magneto-optic material, against damage resulting from excessive mechanical shock and temperature excursions.

2. Description of the Related Art

The recent developments in magneto-optic display assemblies now provide a two-dimensional array of electronically programmable light shutters or valves that can be used to enter information into data processing systems, such as optical correlators, at very high rates. (For an example of one magneto-optic display assembly, see William E. Ross' U.S. Pat. No. 4,550,983 which is assigned to the same assignee.) Coherent, polarized light is used for information processing and can either pass through or be reflected by these magneto-optic light valves where the light is rotated and analyzed in accordance with either the Faraday or the Kerr effects, respectively.

These electrically addressable, such as by coincident current select, magneto-optic light valves are sometimes also identified as a spatial light modulator (SLM) chip. One such SLM chip known in the industry as a LIGHT-MOD TM chip is available from the Data Systems Division of Litton Systems, Inc. at Agoura Hills, Calif. This LIGHT-MOD chip has at its heart a magneto-optic active area having a square side dimension of 0.128 inch (0.325 centimeter) that is structured into a plurality of individual mesas or pixels which are arranged in a 128×128 array. This array is electrically addressable through the use of complementary X- and Y-address conductors so that selected and non-selected pixels function as light valves having visually different and distinct illumination characteristics.

Physically, the SLM chip is an electromagnetic device. The SLM chip is temperature dependent since it loses desirable electromagnetic functions when the chip temperature reaches the Curie point of the particular magneto-optic material which forms the chip. Further, like all semiconductor wafer materials, the magneto-optic chip exhibits extreme fragility. Therefore, the chip can be subject to unwanted cracking or fracturing, even physical shattering, under adverse mechanical forces and resultant deformations affected upon at least the chip.

OBJECTS OF THE INVENTION

Accordingly, it is an object of the invention to provide a new and improved reflective magneto-optic spatial light modulator (MOSLM TM) assembly having a mechanically and thermally protected spatial light modulator (SLM) chip.

It is an object of the invention to provide a reflective MOSLM assembly that channels the ingress and egress of electromagnetic radiation, such as light, incident to the assembly.

It is an object of the invention to provide a reflective MOSLM assembly having a controlled temperature environment that maintains the SLM chip at a temperature less than its Curie point.

It is an object of the invention to provide a reflective MOSLM assembly that is extremely rugged to withstand adverse mechanical forces imposed upon the assembly.

It is an object of the invention to provide a reflective MOSLM assembly that is readily addressable when used in an operating system.

It is an object of the invention to provide a reflective MOSLM assembly stress the MOSLM assembly through heat expansion of its components.

SUMMARY OF THE INVENTION

Briefly, in accordance with the invention, a reflective magneto-optic spatial light modulator (MOSLM TM) assembly is disclosed and claimed having a nonmagnetic protective housing that receives, positions, and protects a spatial light modulator (SLM) chip that is formed from relatively fragile magneto-optic material from deformations caused by mechanical stress and by excessive temperature changes, and the assembly further having a channelled ingress and egress of incident electromagnetic radiation, Such as visible and coherent light, to and from the SLM chip.

While the specification concludes with claims particularly pointing out and distinctly claiming the subject matter which is regarded as the invention, the organization and method of operation, together with further objects, features, and the attending advantages thereof, may best be understood when the following description is read in connection with the accompanying drawing(s).

DESCRIPTION OF THE INVENTION

Figure 1:
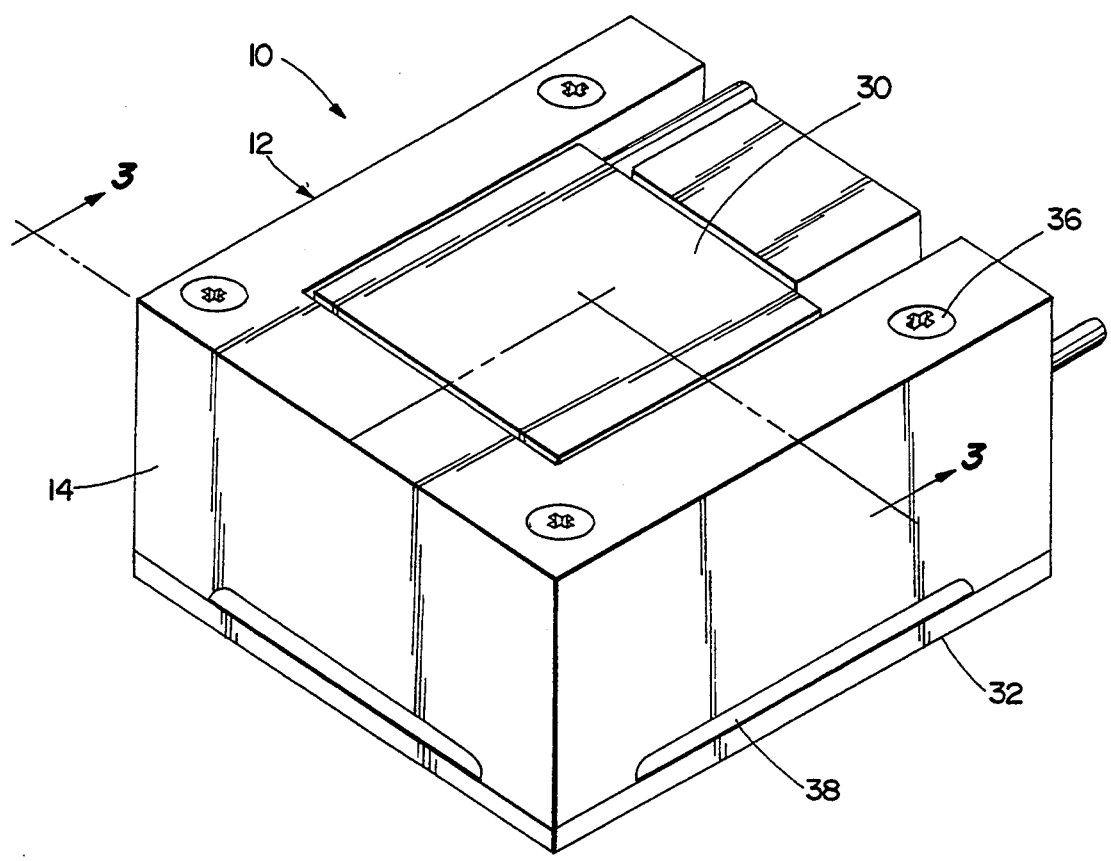
FIG. 1 is a perspective view of the relflective magneto-optic spatial light modulator (MOSLM TM) assembly of the invention.
Figure 2:
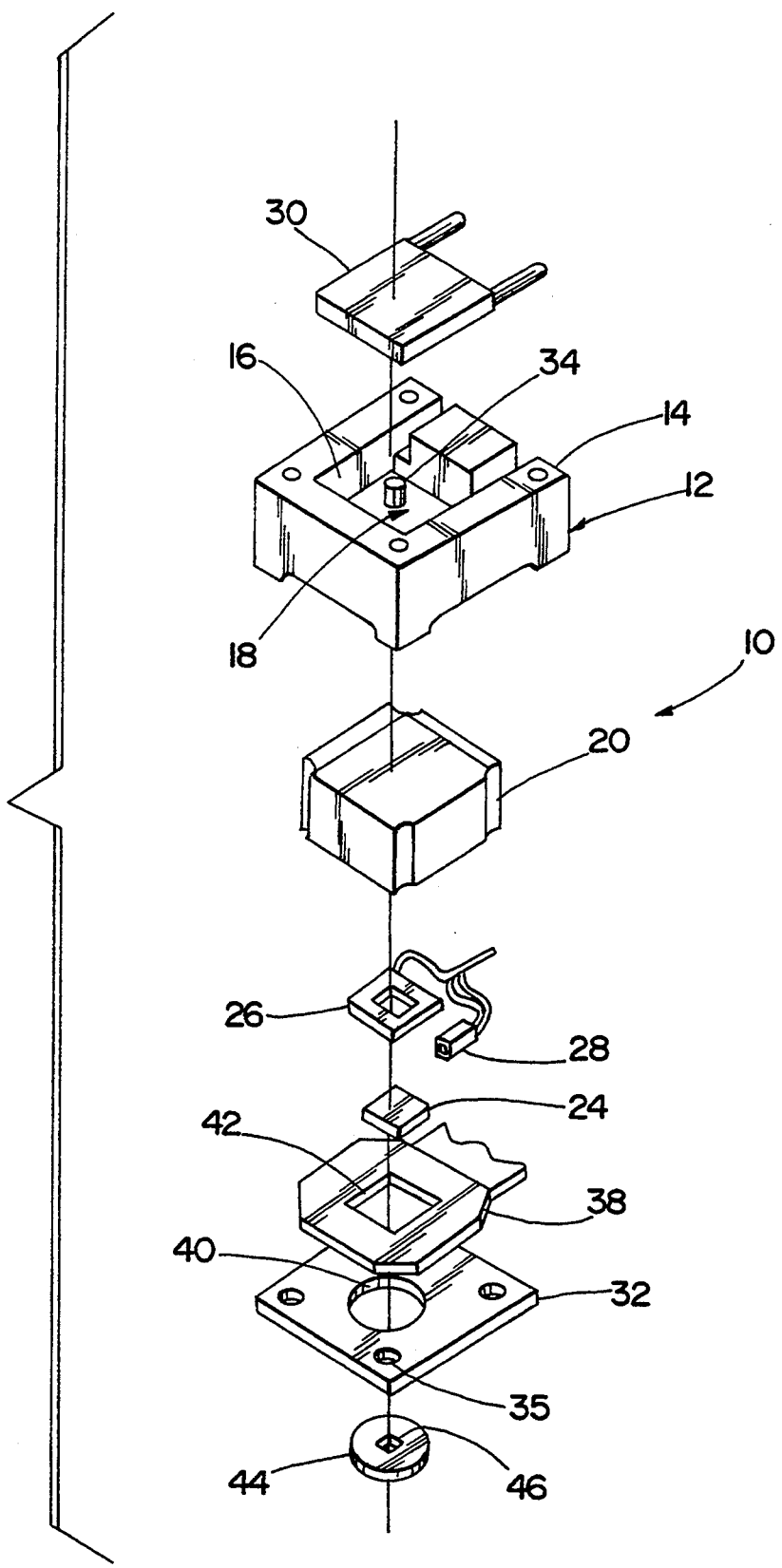
FIG. 2 is an exploded, perspective view of the reflective MOSLM assembly of FIG. 1.
Figure 3:
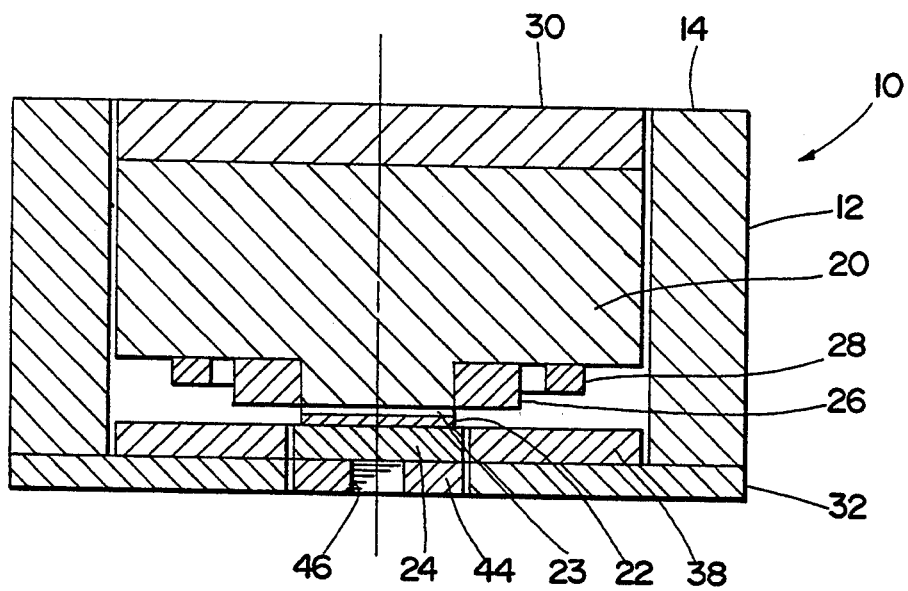
FIG. 3 is a cross section view of the reflective MOSLM assembly of FIG. 1 along the line 3—3.

Referring to FIGS. 1 through 3, a preferred embodiment of the reflective magneto-optic spatial light modulator (MOSLM TM) assembly 10 of the invention includes a nonmagnetic case or housing 12, which can be formed from an epoxy glass, that has a singular, outer case wall 14 with an inner wall surface 16 which defines or develops an inner chamber 18 having a predetermined or selected chamber volume.

The inner chamber 18 as shown by FIGS. 2 and 3, is adapted to receive and contain the following subcomponents. A heat dissipater 20, which can be formed from aluminum nitride, for the dissipation heat energy. A diamond substrate heat spreader or transfer layer 22 that is spaced apart from the reverse surface of the dissipator body by a gap 23 which can be filled with a conventional thermally conductive fluid. During initial alignment of the assembly 10, a conventional shim member sized to the desired gap dimension can be used to set and maintain the gap 23. A spatial light modulator (SLM) chip 24, as described above with reference to the LIGHT-MOD ™ chip, positioned adjacent to the transfer layer 22 and surrounded in a common plane by an electromagnetic coil 26. The coil 26 is also positioned in relatively close proximity to a conventional thermal sensor chip 28. Both the coil 26 and thermal sensor chip 28 have a conventional electrical connector 25 (see FIG. 5) that provides the desired electrical interface with operational control devices (not shown) external to the reflective MOSLM assembly 10.

The obverse surface of the heat dissipater 20 is bounded by a thermoelectric cooler 30, which is a conventional Peltier effect device for the dissipation of heat energy, that closes the complementary obverse, open end of the inner chamber 18 defined within housing 12 and is in direct, heat transfer contact with heat dissipater 20.

In the assembled arrangement the reflective MOSLM assembly 10 as shown by FIGS. 1 and 3, a heat transfer path is established for the dissipation of heat energy from the SLM chip 24 through the heat transfer layer 22, gap 23 and the conductive fluid therein, to the heat dissipater 20 where thermoelectric cooler 30 accomplishes the desired primary cooling of the SLM chip 24 as one source of heat energy, and secondary cooling of the other sources of heat energy, e.g., the coil 26 which is selectively pulsed during operaton of the SLM chip 24 within the inner chamber 18 of case 12.

This assembly of subcomponents within the nonmagnetic case 12 is guided into proper final assembly with a carrier plate 32, which can be formed from alumina, through the cooperative relationship of a pair of similar guide pins 34 (only one guide pin is shown by FIG. 2) that mate with complementary clear holes 35 formed in the carrier plate. Case 12 can be temporarily joined to the carrier plate 32 by one or more similar conventional fasteners 36 which are removed after alignment of the final reflective MOSLM assembly 10. The entire reflective MOSLM assembly 10 is preferably joined together with adhesives for final use in its operative mode.

Figure 5:
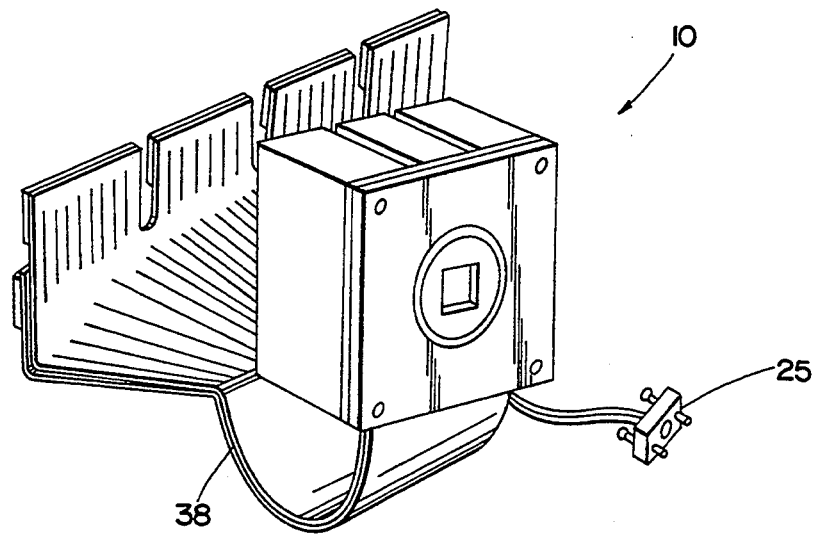
FIG. 5 is a perspective view of the reflective MOSLM assembly of FIG. 1 ready for use in an operating system.

A conventional planar flex connector cable 38 as shown by FIGS. 2 and 5 is sandwiched between the case 12 and the carrier plate 32. This connector cable 38, which can be formed of Kapton (a registered trademark material of DuPont), has a plurality of electrical conductors therein that are connected to electrically address one or more pixels in the magneto-optic pixel array of the SLM chip 24.

Figure 4:
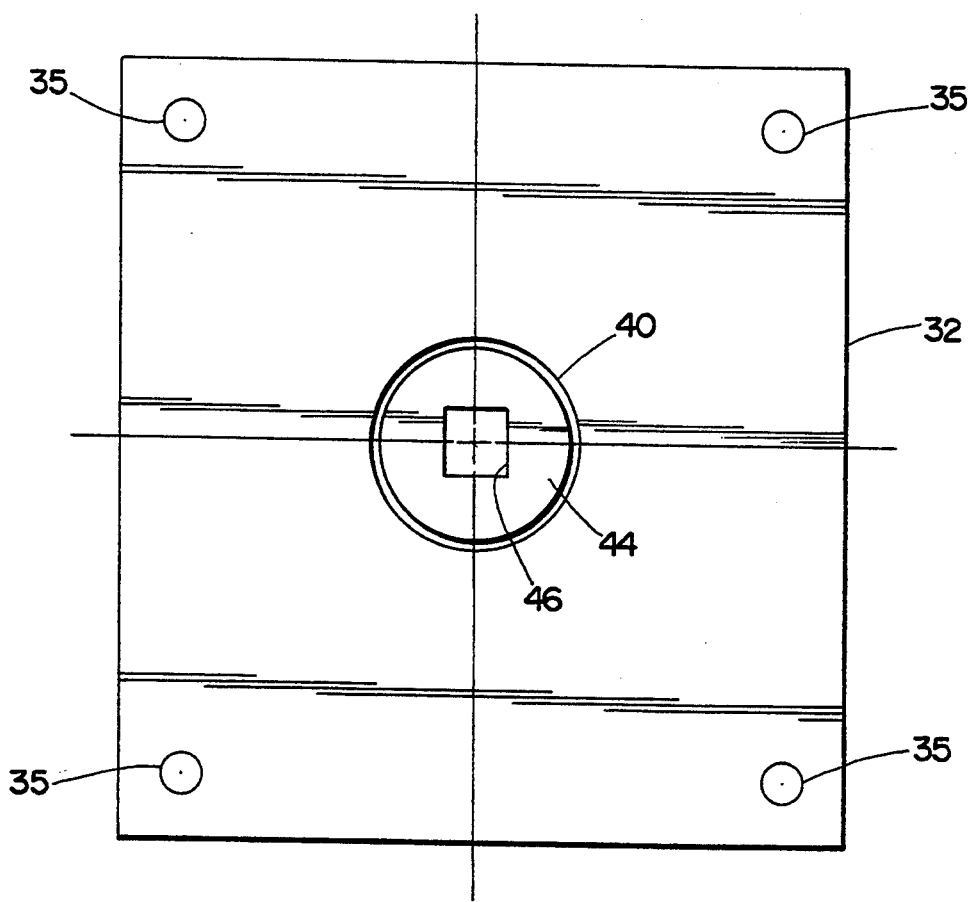
FIG. 4 is an end or bottom view of the reflective MOSLM assembly of FIG. 3.

Referring now in particular to FIGS. 3 and 4, the carrier plate 32 contains an aperture 40 which complements an aperture 42 formed in flex cable 38. These complementary channel apertures 40 and 42 expose the SLM chip 24 to active incident electromagnetic radiation, such as visible light. For example, one visible light can be the coherent light produced by a laser source which has been suitably collimated, filtered and polarized as an optical light beam with or without information content.

An SLM "lens" or mask 44, which can be formed from alumina, is sized to complement the carrier plate aperture 40. This mask 44 has a central aperture 46 that functions as a clean, channel guide for the controlled entrance or ingress, as well as egress, of the optical light beam into the reflective MOSLM assembly 10 so that the light beam is constrained both to "paint the optimum pattern or picture" onto the active, working pixel array of the SLM chip 24 and to reflect the resultant pattern or picture from the chip. Mask 44 is preferably positioned within the carrier plate aperture 40 in a common plane with proper alignment of the complementary apertures 40 and 42. Mask 44 can be attached to the SLM chip 24 with an adhesive after final alignment is made.

Lastly, the completed reflective MOSLM assembly 10 is shown by FIG. 5 as a useable component for an optical information processing system; for example, a reflective optical correlator system.

As will be evidenced from the foregoing description, certain aspects of the invention are not limited to the particular details of construction and of function as illustrated and described. It is contemplated that modifications and other applications will occur to those skilled in this art. However, it is intended that the appended claims shall cover such modifications and applications which do not depart from the true spirit and scope of the present invention.

We claim:

1. A reflective, magneto-optic spatial light modulator (MOSLM) assembly comprising:
    a) nonmagnetic housing means defining a bounded inner chamber,
    b) at least one MOSLM chip positioned and protected within said chamber, said chip having a planar reflective surface,
    c) temperature or thermal sensor means sensing the ambient temperature within said chamber and generating a corresponding ambient temperature signal,
    d) cooler means responsive to said ambient temperature signal extracting thermal energy from said chamber to maintain a predetermined temperature operating range within said chamber where said range includes operating temperatures less than the Curie point temperature of said MOSLM chip,
    e) electrical interconnect means providing signal input and output paths to and from said chip, and
    f) aperture means penetrating said housing means exposing said chip so that incident electromagnetic radiation has an entrance and exit means through said aperture means to and from said MOSLM chip.

2. The reflective MOSLM assembly of claim 3 in which said cooler means is a thermoelectric cooler means bounding at least one wall of said chamber.

3. The reflective MOSLM assembly of claim 3 in which said electrical interconnect means further provides signal interconnects between said thermal sensor means and said cooler means.

4. The reflective MOSLM assembly of claim 1 in which said electrical interconnect means is a flex cable that is fly-wire bonded to said MOSLM chip.

5. The reflective MOSLM assembly of claim 2 in which said thermoelectric cooler means further includes:
    a) a thermoelectric cooler,
    b) a heat energy dissipator block forming said one wall and having obverse and reverse surfaces where said obverse surface is contiguous with said thermoelectric cooler and said reverse surface adjoins said MOSLM chip, and c) a diamond heat transfer substrate positioned adjacent to by said reverse surface in juxtaposition with said MOSLM chip.

6. The reflective MOSLM assembly of claim 5 in which said diamond substrate is spaced-apart from said MOSLM chip that develops a gap therebetween filled with a thermally conductive fluid.

7. The reflective MOSLM assembly of claim 1 in which said assembly further comprises an electromagnetic coil adjoining said thermal sensor means within said chamber and spaced apart from said MOSLM chip that is selectively energized or pulsed to establish a resultant and predetermined electromagnetic field having a selected effect on said chip during operation of said MOSLM chip within the assembly.

8. The reflective MOSLM assembly of claim 2 in which said aperture means is a port in another wall of said chamber.

9. The reflective MOSLM assembly of claim 8 in which said port receives an apertures mask having an aperture sized to maximize the effective working area of said planar reflective surface to the incident electromagnetic radiation.

10. The reflective MOSLM assembly of claim 5 in which said nonmagnetic housing means includes:

a) a carrier plate having a central aperture, and b) an open-ended case having an outer wall bounding said inner chamber and said heat dissipator block positioned within said inner chamber and forming said one wall of said inner chamber, said case positioned on and removably fastened to said carrier plate forming a remaining wall of said chamber with said carrier plate aperture opening to said thus bounded inner chamber.

11. The reflective MOSLM assembly of claim 10 central aperture receives an apertures mask having an aperture sized to maximize the effective and exposed pixel array area of said MOSLM chip.

* * * * *